Figure 3:
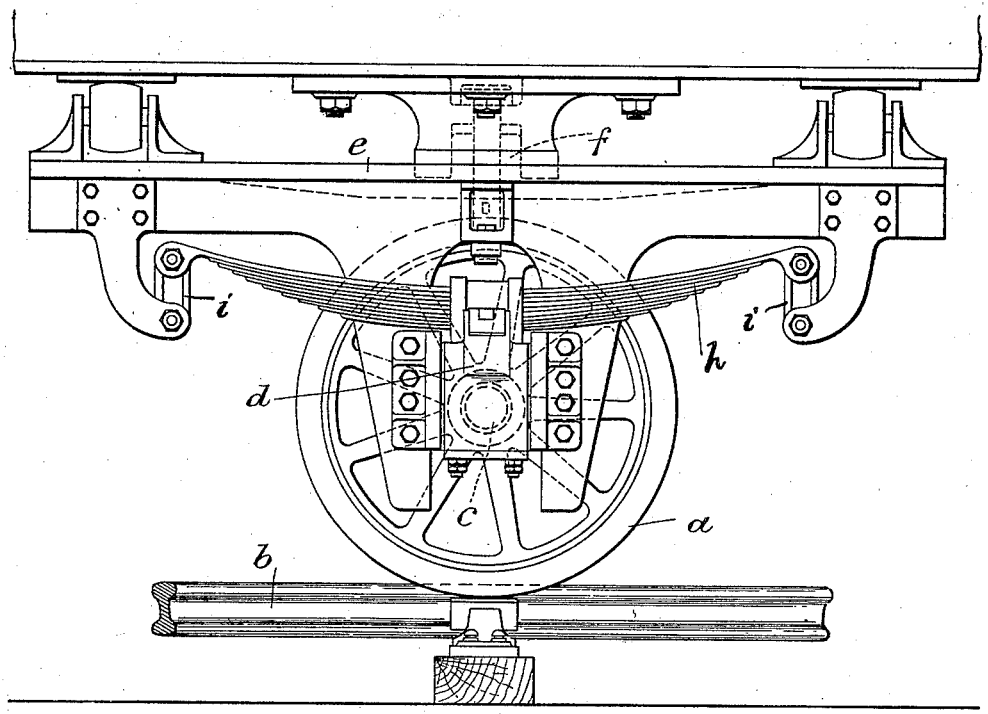

No. 701,469. Patented June 3, 1902.
D. D. COATH.
RAILWAY OR TRAMWAY VEHICLE.
(Application filed Mar. 6, 1901.)
(No Model.) 2 Sheets—Sheet 1.
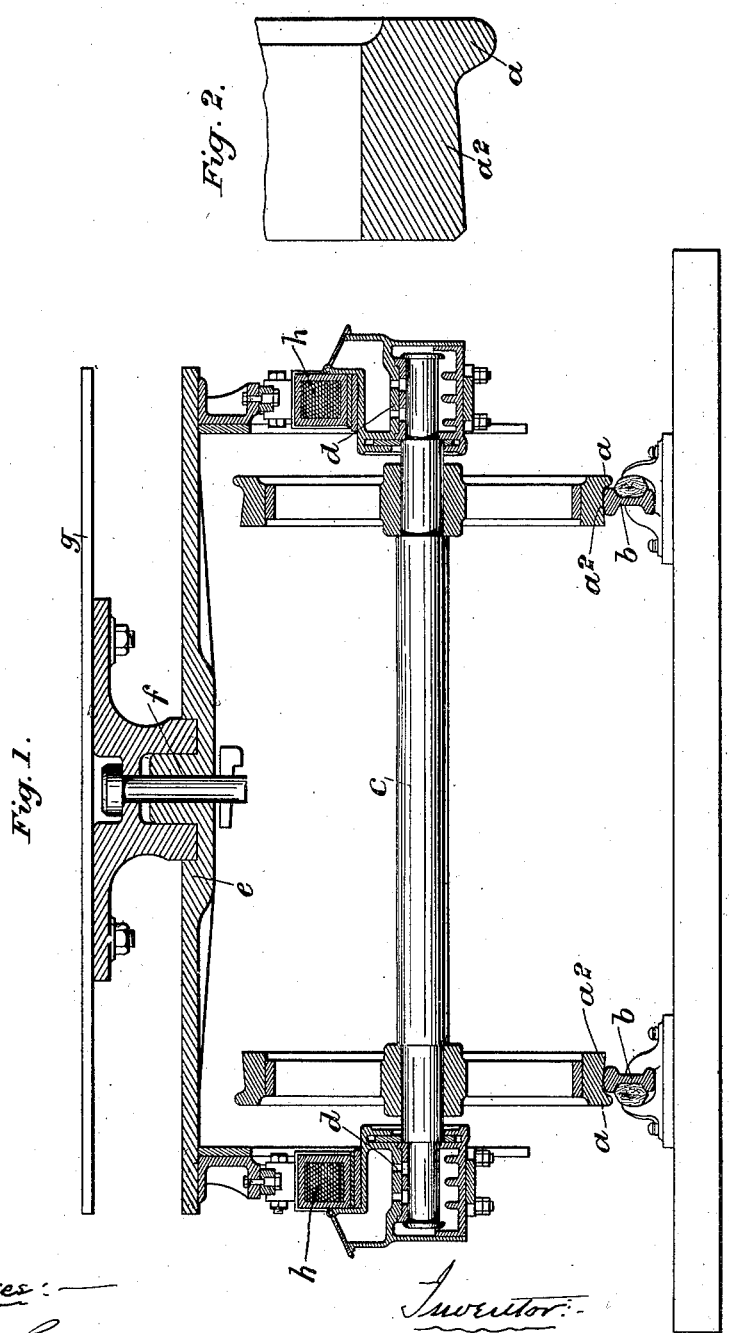

No. 701,469. Patented June 3, 1902.
D. D. COATH.
RAILWAY OR TRAMWAY VEHICLE.
(Application filed Mar. 6, 1901.)
(No Model.) 2 Sheets—Sheet 2.

UNITED STATES PATENT OFFICE.

DAVID DECIMUS COATH, OF RANGOON, INDIA.

RAILWAY OR TRAMWAY VEHICLE.

SPECIFICATION forming part of Letters Patent No. 701,469, dated June 3, 1902.

Application filed March 6, 1901. Serial No. 50,096. (No model.)

*To all whom it may concern:*

Be it known that I, DAVID DECIMUS COATH, a subject of the King of Great Britain and Ireland, and a resident of Rangoon Foundry, Rangoon, Burmah, India, have invented certain new and useful Improvements in or Connected with Railway or Tramway Vehicles, which invention is fully set forth in the following specification.

The object of this invention is to so construct or arrange the railway and tramway vehicles that they will run around the sharpest curves with safety and without the great resistance, and consequent wear upon the rails, which takes place with vehicles as hitherto arranged.

According to this invention the wheels of the vehicles are made with flanges which are situated outside the rails on which the vehicles run, and the tread of the wheel is preferably made inclined or in the form of a frustum of a cone, the inward part of the tread being of greater diameter than the outward part. The axle is arranged or mounted so that it will turn independently of the body of the vehicles upon a pivot perpendicular to the center of the length of the said axle.

The accompanying drawings illustrate, in Figure 1, in elevation, partly in section, an arrangement in accordance with this invention. Fig. 2 represents in section a part of one of the wheels, and Fig. 3 is a side elevation of the trucks.

The wheels are made with flanges $a$, which are situated outside the rails $b$, and the treads $a^2$, which run on the said rails, are made in the form of a frustum of a cone, the inward part being of greater diameter than the outward part next the flange $a$. The axle $c$ of the wheels is mounted in journal-boxes $d$ $d$. Springs $h$, superposed upon the journal-boxes, support the truck-frame $e$ through the intermediary of links $i$, said truck-frame being connected by the bolt $f$ to the vehicle, the bottom of which is shown at $g$, so that the axle and bogie can turn independently of the body of the vehicle. The invention is not limited to this precise construction of the parts by which the axle is connected with the body of the vehicle so that the said axle and wheels can turn independently of the body of the vehicle. The wheels of vehicles thus arranged in running around curves do not tend to jam and grind against the sides of the rails, but run around curves with ease and without any danger of becoming derailed.

Having now particularly described and ascertained the nature of the said invention and in what manner the same is to be performed, I declare that what I claim is—

In connection with a railway or similar vehicle, a two-wheeled truck, consisting of the two wheels each having an outer flange and with its main portion increasing in diameter inward from said flange, the axle carrying said wheels and extended beyond the same to provide an outer spindle at each end, a journal-box with superposed car-spring upon each spindle, a truck-frame carried by said journal-boxes and springs, and a fifth-wheel and king-bolt on said truck-frame, upon and by which the vehicle-body is attached to said truck, said fifth-wheel and king-bolt being directly above the geometric center of said axle, substantially as and for the purpose described.

In testimony whereof I have signed this specification in the presence of two subscribing witnesses.

DAVID DECIMUS COATH.

Witnesses:
C. A. MCNEIL,
J. B. WICKIE.